Figure 1:
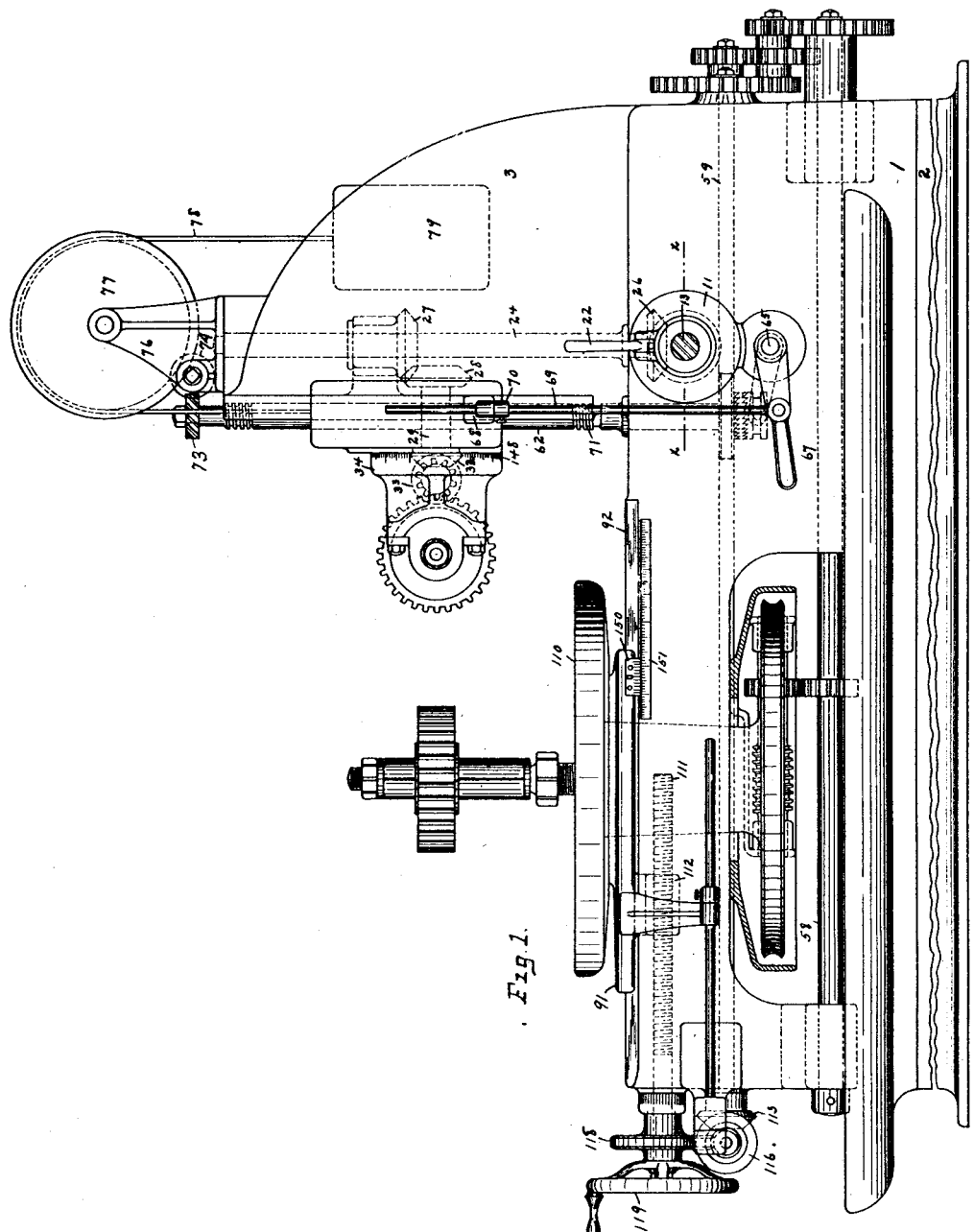

F. L. EBERHARDT & W. F. ZIMMERMANN.
UNIVERSAL GEAR CUTTER.
APPLICATION FILED FEB. 18, 1907. RENEWED JUNE 21, 1911.

1,028,815.

Patented June 4, 1912.

8 SHEETS—SHEET 1.

F. L. EBERHARDT & W. F. ZIMMERMANN.
UNIVERSAL GEAR CUTTER.
APPLICATION FILED FEB. 18, 1907. RENEWED JUNE 21, 1911.

1,028,815.

Patented June 4, 1912.

8 SHEETS—SHEET 3.

F. L. EBERHARDT & W. F. ZIMMERMANN.
UNIVERSAL GEAR CUTTER.
APPLICATION FILED FEB. 18, 1907. RENEWED JUNE 21, 1911.

1,028,815.

Patented June 4, 1912.

8 SHEETS—SHEET 4.

F. L. EBERHARDT & W. F. ZIMMERMANN.
UNIVERSAL GEAR CUTTER.
APPLICATION FILED FEB. 18, 1907. RENEWED JUNE 21, 1911.

1,028,815.

Patented June 4, 1912.

8 SHEETS—SHEET 5.

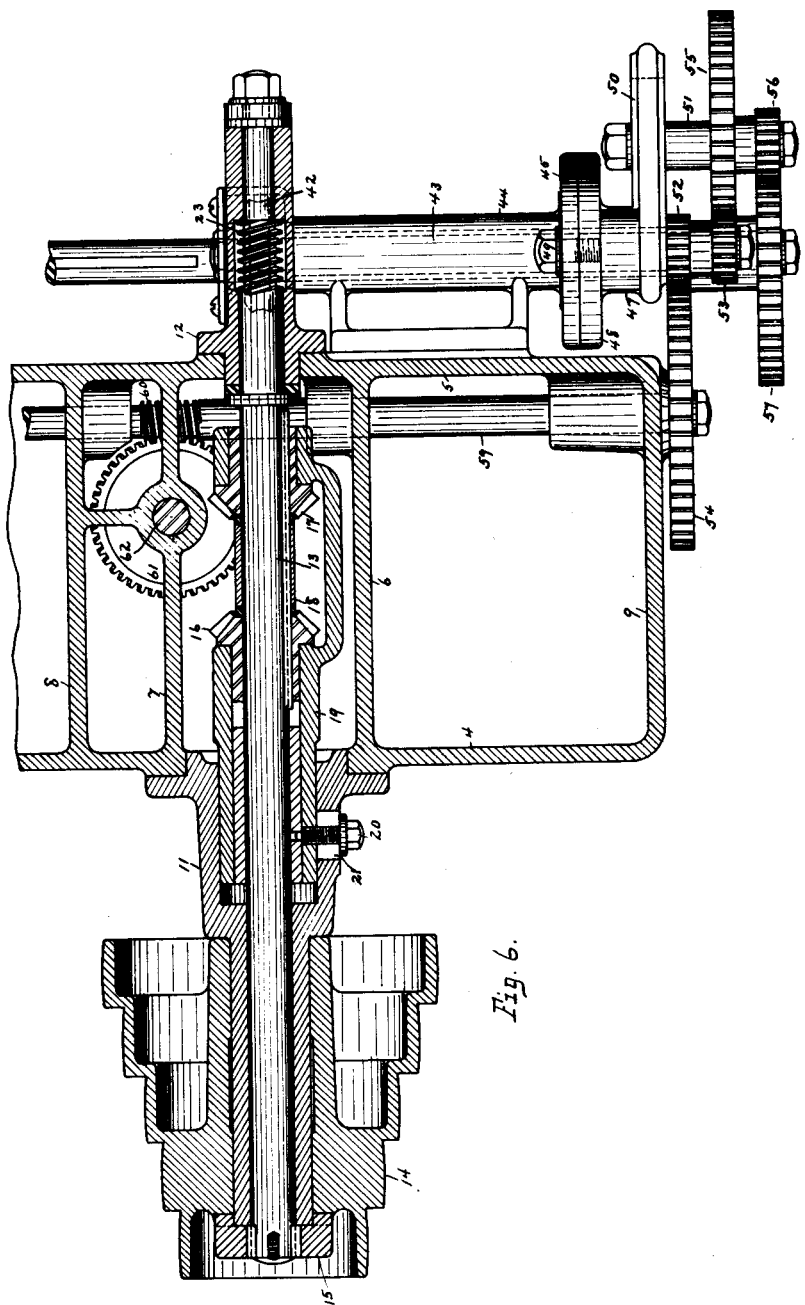

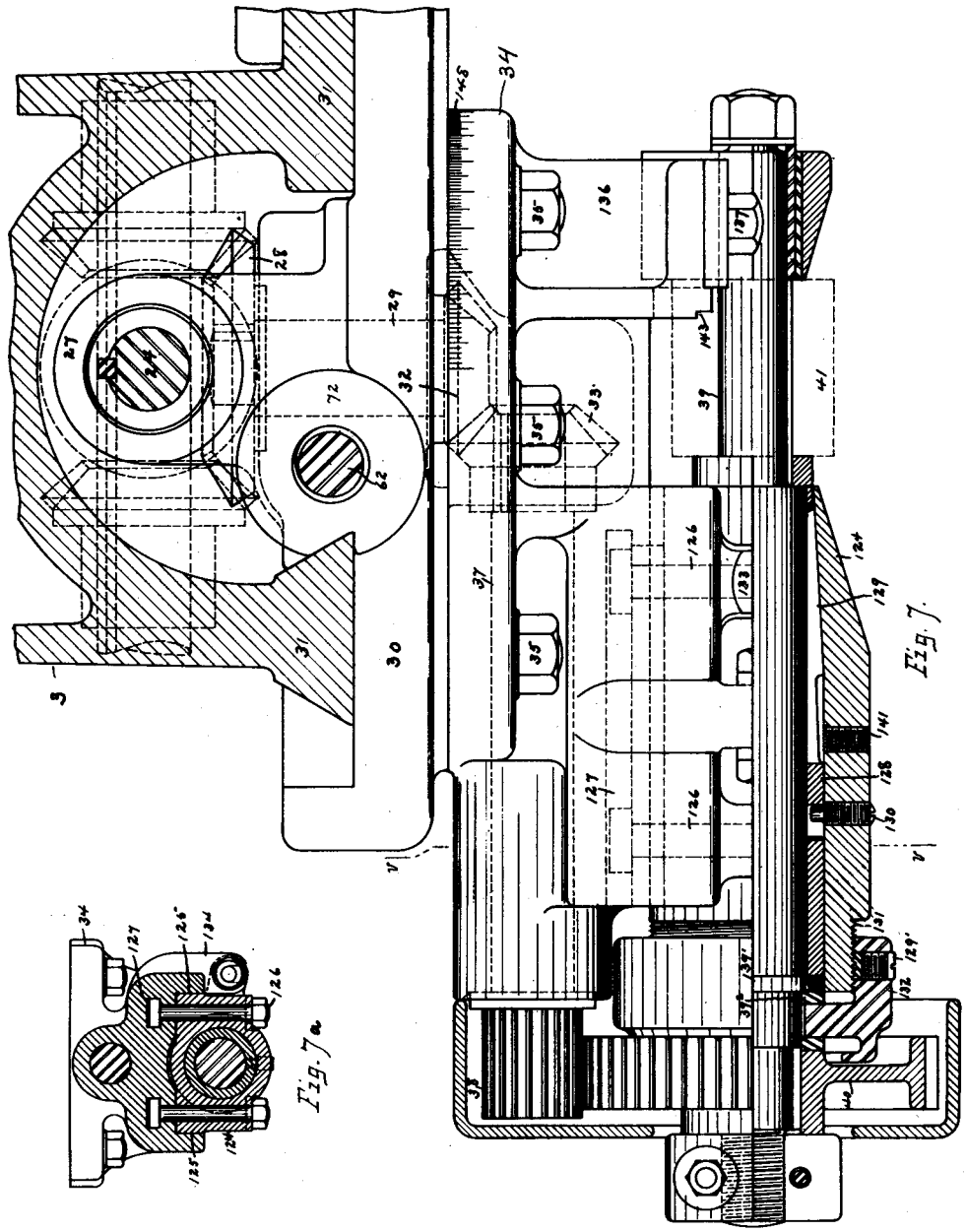

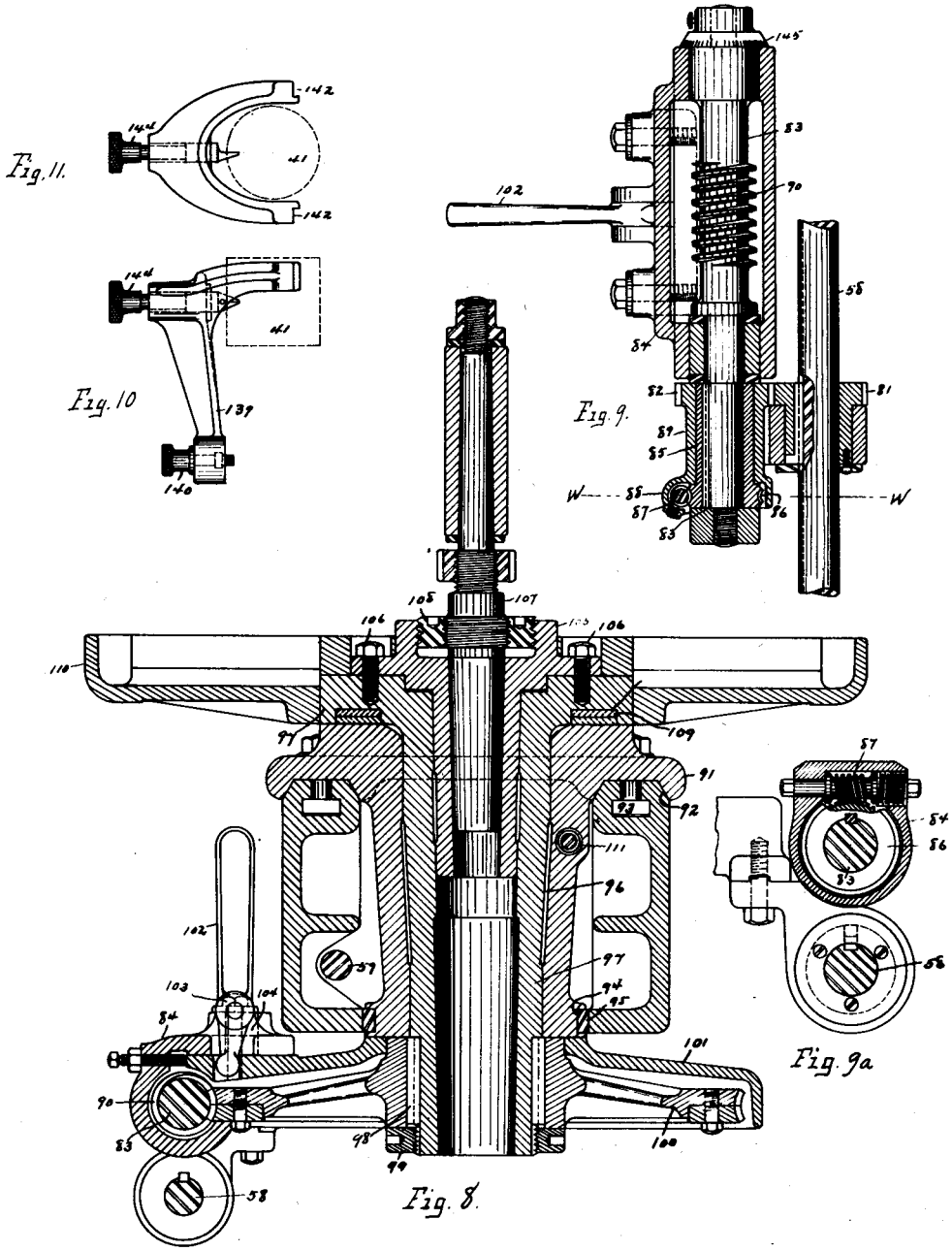

UNITED STATES PATENT OFFICE.

FREDERICK L. EBERHARDT AND WILLIAM F. ZIMMERMANN, OF NEWARK, NEW JERSEY.

UNIVERSAL GEAR-CUTTER.

1,028,815.    Specification of Letters Patent.    Patented June 4, 1912.

Application filed February 18, 1907, Serial No. 357,782. Renewed June 21, 1911. Serial No. 634,526.

*To all whom it may concern:*

Be it known that we, FREDERICK L. EBERHARDT and WILLIAM F. ZIMMERMANN, both residents of the city of Newark, county of Essex, and State of New Jersey, have invented a new and useful Improvement in Universal Gear-Cutters, of which the following is a full, clear, and exact description, such as will enable others skilled in the art to which it pertains to make and use the same.

The object of our invention is to produce a gear cutter operating upon the intermeshing principle and following Sang's theory for the generation of gear teeth of the involute type for spur, spiral or worm gears, and making use of the helical cutter or so-called "hob," the teeth of the spur and spiral being cut by giving the "hob" a forward motion across the face of the wheel blank and parallel to its axis, and to the worm gear, the "hob" having a motion in a plane perpendicular to the axis and toward the center of the blank.

Our invention is based upon a mathematical formula, which we have discovered and the structure embodying our invention is of such a character that spur, spiral or worm gears may be cut upon it by giving the necessary attention to the setting of the machine before beginning the operation. We are enabled to give the proper curve for each diameter and number of teeth generated and produce more accurate results by reason of the fact that when the cutter has traversed the face of a gear blank, the gear will be finished and the teeth will be found to be more accurate because of the continuous and uniform indexing of the blank and the uniform and symmetrical heating of the blank due to the friction of cutting.

In cutting spiral gears, we are enabled by our structure to dispense with differential gears or the so-called "jack-in-the box." We are also enabled by our structure to more perfectly control the feeding mechanism both of the cutter and of the blank itself as well as of the relative ratios of rotation of cutter and blank.

In carrying out our invention, we make use of the structure illustrated in the accompanying drawings, wherein like letters of reference refer to like parts throughout, and in which—

Figure 2:
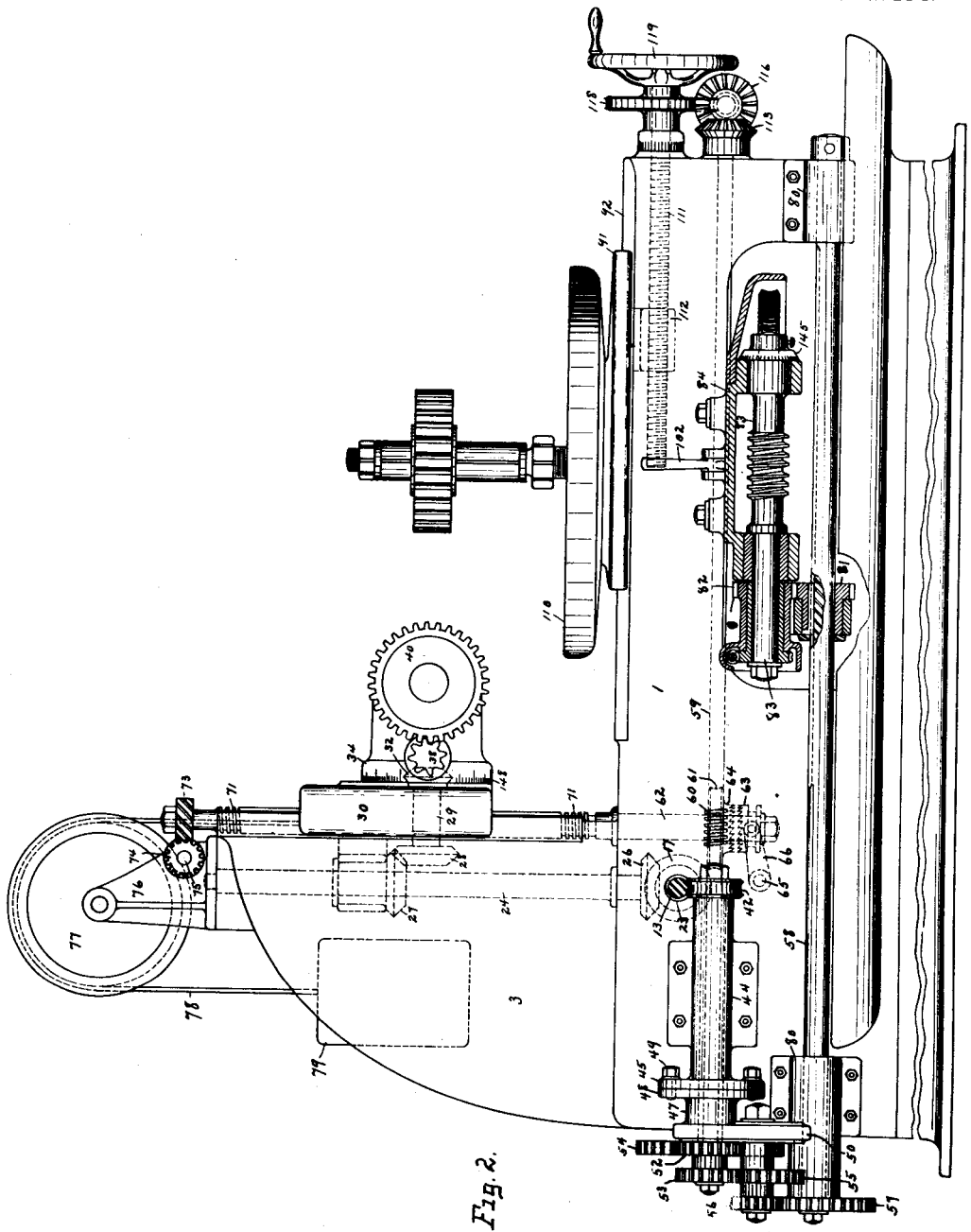
Figure 3:
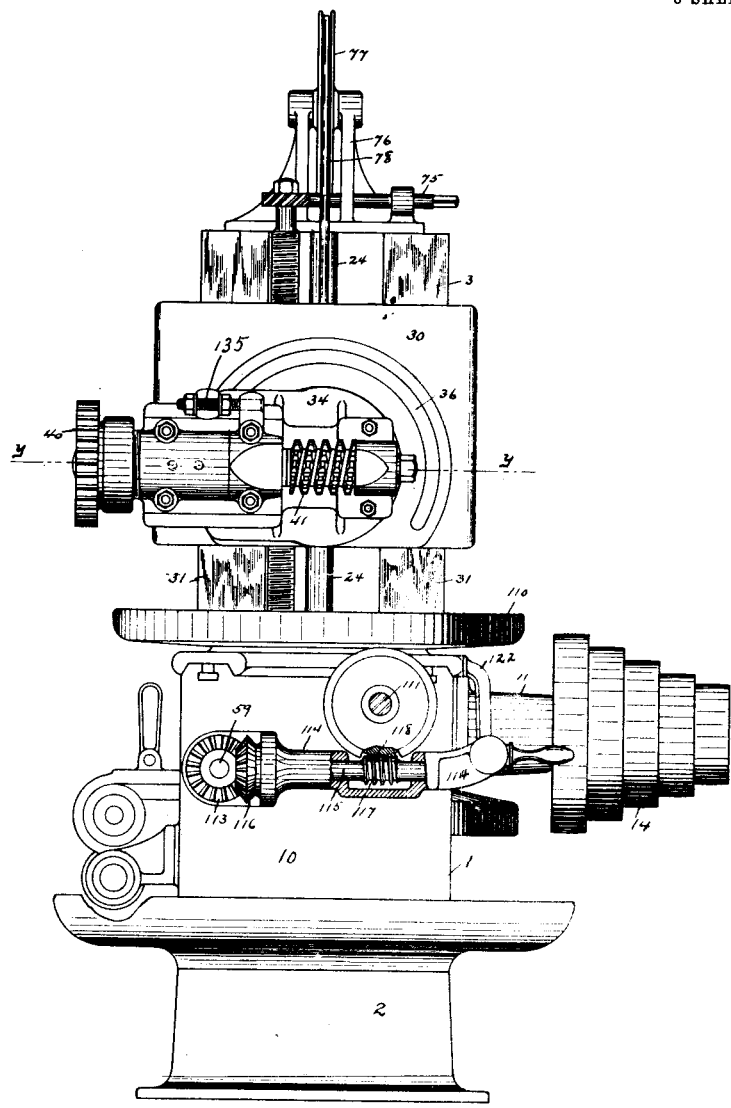
Figure 4:
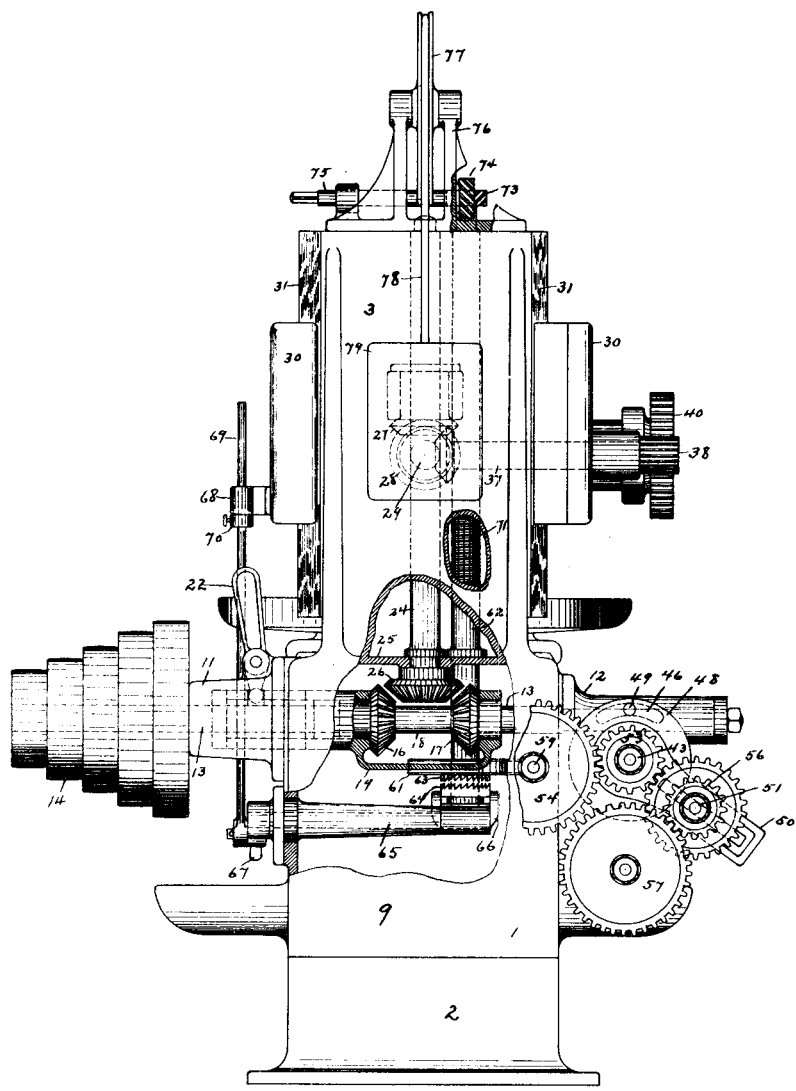
Figure 5:
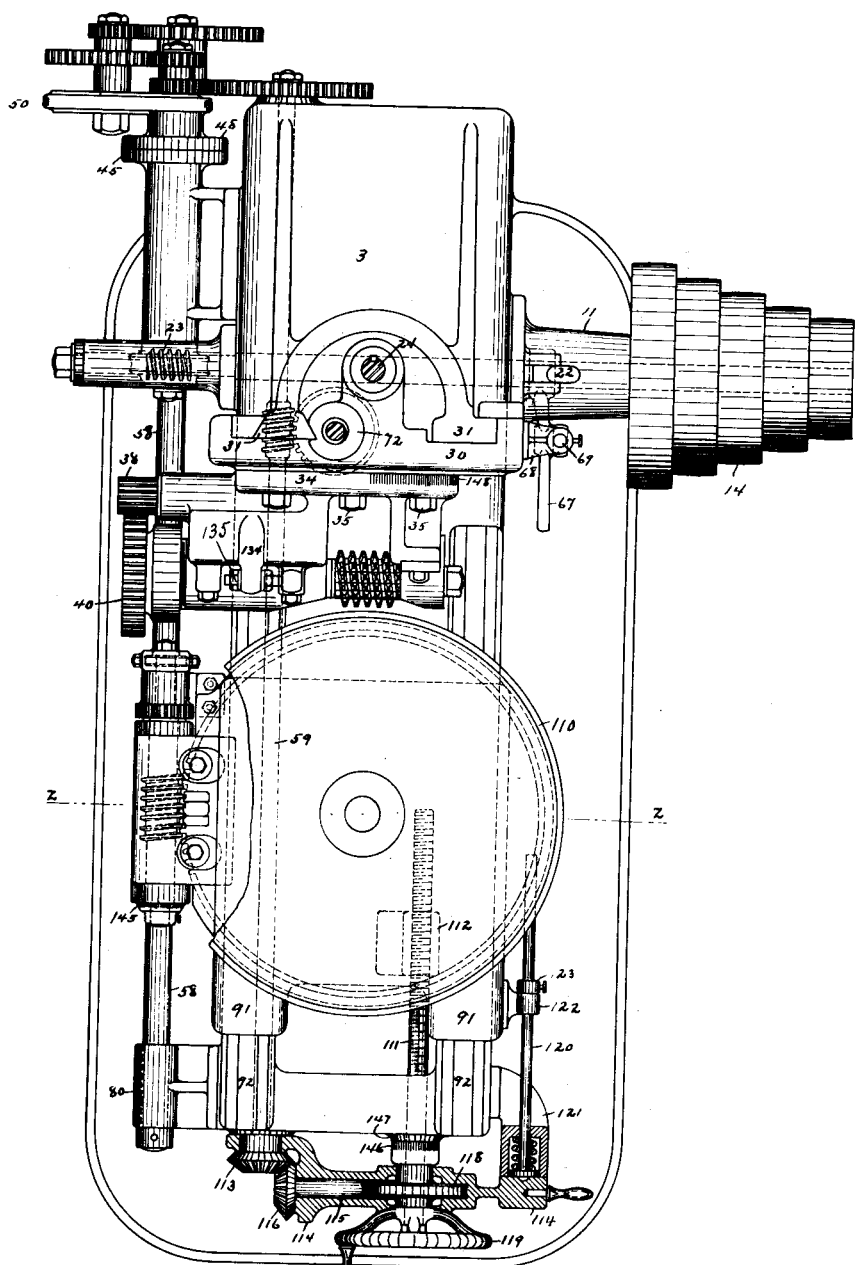

Figure 1 is a side elevation illustrating the right-hand side of the gear cutter. Fig. 2 is a left hand side elevation. Fig. 3 is a front elevation. Fig. 4 is a rear end elevation. Fig. 5 is a plan view. Fig. 6 is a sectional view on line $x$—$x$ of Fig. 1. Fig. 7 is a sectional view on line $y$—$y$ of Fig. 3. Fig. 7$^a$ is a sectional view on line $v$—$v$ of Fig. 7. Fig. 8 is a sectional view on line $z$—$z$ of Fig. 5. Fig. 9 is a longitudinal sectional view of the index drive shaft and adjustments therefor. Fig. 9$^a$ is a sectional view on line $w$—$w$ of Fig. 9. Fig. 10 is a plan view, and Fig. 11 is an end elevation of a cutter gage.

Similar letters of reference refer to like parts throughout the specification and drawings.

As above stated, our invention is based upon a mathematical formula, and in order to more fully understand the complete operation of our invention, we shall first proceed with a description of the method of deducing the formulas for the production of spiral gears in connection with its trigonometrical functions.

In the deduction of the formulas for the production of spiral, spur and worm gears, we shall make use of the following notation, viz:

$P^{nc}$=normal circular pitch of helical cutter to be used.

$P^{nd}$=normal diametral pitch of the helical cutter.

$P^c$=circular pitch of the gear to be cut.

$P^L$=linear pitch of gear parallel with its axis.

N=number of teeth in the gear.

D=pitch diameter of the gear.

D°=outside diameter of the gear.

$a$=addendum.

$\alpha$ = angle of the gear spiral with its axis.
L = the lead of the spiral or the advance in one turn of the same.

The following formulas are those in common use for the determination of the ordinary setting of gear cutters where $P^{nc}$, N and $\alpha$ are given.

$$P^{nd} = \frac{\pi}{P^{nc}}.$$

$$P^{c} = \frac{P^{nc}}{\cos.\alpha} = \frac{\pi D}{N}.$$

$$P^{L} = \frac{P^{nc}}{\sin.\alpha} = \frac{\pi}{P^{nd} \sin.\alpha}.$$

$$D = \frac{P^{nc}}{\pi \cos.\alpha} = \frac{P^{c} N}{\pi}.$$

$$D^{o} = D + 2a.$$

$$a = \frac{P^{nd}}{\pi} = \frac{1}{P^{nd}}.$$

$$L = \frac{N P^{nc}}{\sin.\alpha} = \frac{N P^{c}}{\tan.\alpha} = \frac{N \pi}{P^{nc} \sin.\alpha}.$$

In cutting spiral gears upon any automatic spiral gear cutter with a helical cutter, it is always necessary to rotate the blank in unison with the helical cutter or hob at a speed depending upon the number of teeth to be cut in the blank, while at the same time, the teeth of the cutter are advanced across the face of the blank in what results in a helical path upon the peripheral face of the blank, such path being due in other machines to differential gears inserted in the cutter drive or indexing mechanism. We are able in our structure to produce the helical path by adding or subtracting a small increment to or from the rotary speed of the blank, according to the style of gear to be cut, such increment depending on the relation of the forward motion of the helical cutter to the fixed relation between the revolutions of the cutter and the blank.

To index in a machine, as will be described hereinafter, the formula for the number of teeth would be $$\frac{C}{N}$$

where C represents a constant depending upon the relative ratios of rotation of work spindle to that of the helical cutter, and N represents the number of teeth to be cut. The lead L of the spiral as shown above $$= \frac{N P^{nc}}{\sin.\alpha} = \frac{N P}{\tan.\alpha} = \frac{N}{P^{nc} \sin.\alpha},$$

and letting C' equal the relative ratios of the feed to the work, and V equal a variable depending upon the amount of forward motion of the helical cutter, the value of the increment to be added or subtracted for the helical path will become $$\frac{V}{C'L},$$

which becomes upon substitution of the values of $$L, \frac{V \sin.\alpha}{C' N P^{nc}} = \frac{V \tan.\alpha}{C' N P^{c}} = \frac{V P^{nd} \sin.\alpha}{C' N \pi},$$

adding or subtracting this increment to or from the formula for the number of teeth, we obtain the complete formulas for setting the machine to cut helical gears which is $$\frac{C}{N} \pm \frac{V \sin.\alpha}{C' N P^{nc}},$$

or $$\frac{C}{N} \pm \frac{V \tan.\alpha}{C' N P^{c}},$$

or $$\frac{C}{N} \pm \frac{V P^{nd} \sin.\alpha}{C' N \pi},$$

which by algebraic transformation equals $$\frac{C C' P^{nc} \pm V \sin.\alpha}{C' N P^{nc}},$$

or $$\frac{C C' P^{c} \pm V \tan.\alpha}{C' N P^{c}},$$

or $$\frac{C C' \pm V P^{nd} \sin.\alpha}{C' N \pi}.$$

The specific formula to be used in a given case depends upon the data given.

The formulas just given, it will be noted, contain the plus and minus signs, and they indicate the addition or subtraction of the increment above referred to, and may be explained as follows: When using a right hand helical cutter in cutting a right hand helical gear, or a left hand helical cutter for cutting a left hand helical gear, the formulas with the plus sign only are used, but with a right hand cutter for cutting a left hand gear, or a left hand cutter for cutting a right gear, the formulas with the minus sign only are used. The helical cutter must be set at an angle equal to the angle of the helix of the blank minus the angle of the helix of the cutter when using plus signs in the above formulas, or at an angle equal to the angle of the helix of the blank plus the angle of the helix of the cutter when using the minus signs.

A concrete example may serve to illustrate the application of the formula; let it be required to cut a right hand spiral gear with a right hand helical cutter, said gear having 40 teeth with a normal circular pitch of ⅜ of an inch, the teeth lying at an angle of 30° in which case the lead L is 50 inches as can be readily determined with the axis of the blank. The formula to be used in this case is $$\frac{CC'P^{nc} + V \sin. \alpha}{C'NP^{nc}}.$$

The cutter feed gear, by means of the change of gears, will be in the ratio of 1 to 1. Assuming the values of C as 120, C' as 6 and V as 1, and substituting these values in the formula, we have $$\frac{(120 \times 6 \times \tfrac{1}{8}) + \tfrac{1}{2}}{6 \times 40 \times \tfrac{3}{8}} = \frac{901}{300}.$$

On interpreting this result, it will be found that for each revolution of the cutter, the index wheel makes $$\frac{901}{3600}$$

of a revolution, while at the same time, the cutter slide feeds $$\frac{1}{720}$$

of an inch. For 50 inches, the cutter will make 36000 revolutions, while the blank makes 901 revolutions. 40 revolutions of the cutter normally i. e., without the downward feed will make 1 revolution of the blank. It will be seen therefore, that the blank will have made 901 revolutions for 50 inches of lead, 900 of which are due to the 36000 revolutions of the cutter and the extra one revolution is due to the increment of acceleration given to the cutter, and 901 revolutions of the blank less 900 revolutions leaves the 1 extra which is the required result for producing the above described gear.

Proceeding now with the detailed description of the gear cutter itself, further reference will hereinafter be made to the specific application of the formulas in the actual cutting of spiral, spur and worm gears. The frame or body of our machine consists of the horizontal bed 1 mounted upon a base 2 to which it is secured in any convenient or desired manner. Cast integral with or otherwise rigidly secured to one end of the bed 1, is the stanchion 3. The bed 1 and the stanchion 3 are of hollow construction, having the side walls 4 and 5, and the cross walls 6, 7 and 8 together with the end walls 9 and 10. Mounted in the side walls 4 and 5 are the bearing brackets 11 and 12, in which is mounted the driving shaft 13. Secured at the right hand end of the shaft 13 is the cone 14 which finds the greater portion of its bearing upon the sleeve portion of the bracket 11. The cone 14 is secured to rotate with the shaft 13 by means of the clutch nut 15. The shaft 13 has mounted upon its middle portion the splined bevel gears 16 and 17, separated by the sleeve 18 and connected together by means of the sliding yoke 19, the said yoke 19 being held against rotation by means of the sliding set screw 20 which passes through the slot 21 in the bracket 11. The yoke 19 is longitudinally shiftable upon the shaft 13 by means of the lever 22 pivoted to the bracket 11 and engaging the sleeved portion of the yoke as shown in Fig. 4. The left hand end of the shaft 13 is provided with the worm 23, said worm being wholly inclosed within the bearing bracket 12 as illustrated.

Vertically mounted in the stanchion 3 is the shaft 24, finding its lower bearing in the cross partition 25. At the lower end of the shaft 24 is the bevel gear 26, arranged for engagement with either of the bevel gears 16 or 17 mounted on the shaft 13. The upper end of the shaft 24 bears in the upper end of the stanchion as illustrated in Figs. 2 and 5. Splined upon the shaft 24 is the bevel gear 27 which in turn meshes with the bevel gear 28 which is mounted upon the end of the short center shaft 29 carried in the vertical slide or carriage 30. The carriage 30 slides vertically upon the ways 31 upon the forward face of the stanchion 3. This center shaft 29 carries upon its forward end, a small bevel gear 32 for engagement with the bevel gear 33, hereinafter described.

Upon the forward face of the slide or carriage 30 is mounted the swivel carriage 34, secured upon the face of the carriage 30 to swivel concentrically with the center shaft 29. This swivel carriage 34 may be set in any position upon the face of the carriage 30 and secured in set position by means of the bolts 35, the heads of which take into the T-shaped slot 36 in the slide 30. Extending laterally in suitable bearings in the swivel 34 is the shaft 37, carrying at its one end, the bevel gear 33, heretofore referred to, and at its outer or opposite end, the wide faced spur gear 38. Mounted in suitable bearings directly in front of the shaft 37 is the cutter shaft 39, upon the outer end of which is the spur gear 40 meshing with the gear 38. The cutter 41 is mounted upon the shaft 39 between the bearings as illustrated in Figs. 3, 5 and 7, and it will be seen that when the gear 26 is in engagement with either of the bevel gears 16 or 17, the cutter 41 will be caused to rotate in one direction or the other. Suitable adjusting mechanism, hereinafter described, is secured in the bearing for the cutter shaft for accurately setting the position of the cutter 41, before beginning the operation of cutting gears.

The worm 23 upon the main shaft 13 meshes with the worm wheel 42, secured upon the forward end of a short counter shaft 43 which is mounted in a long bearing 44, secured to the side wall of the bed, as illustrated in Fig. 2. The rear end of the bearing 44 is provided with an enlarged flange 45 having circular slots 46 in its face as illustrated in dotted lines in Fig. 4. A casting 47 having the flange 48 of the same size and shape as the flange 45, is secured by means of the bolts 49 passing through the circular slots and screwed into the flange 48. This casting 47 is provided with the lateral arm 50 slotted at its outer end, to receive a short stud shaft 51. Secured upon the rear end of the shaft 43 are the spur gears 52 and 53 spaced apart, the gear 52 meshing with the spur gear 54 hereinafter described, while the spur gear 53 meshes with the gear 55 upon the stub shaft 51. A spur gear 56 is secured upon the stub shaft 51 and meshes with a spur gear 57 mounted upon the forward end of the shaft 58. These gears just referred to, constitute a change gear system, and it is understood that in operation, gears of different sizes are to be used for different sizes of gears to be cut, the number of teeth in each one of the train depending upon the pitch and lead of the gear to be cut, as developed by the formulas hereinbefore set forth.

The gear 54 is secured upon the forward end of the shaft 59 which is mounted in bearings as illustrated in Fig. 6, and extends to the forward end of the bed as illustrated in Fig. 2. This shaft 59 carries the worm 60 illustrated in Fig. 6, which meshes with the worm wheel 61 loosely mounted upon the lower end of the cutter carriage feed shaft 62. At the lower end of the feed shaft 62, is the clutch member 63, splined on the lower end of the shaft and vertically movable. The lower face of the worm wheel 61 is provided with another clutch member 64 for engagement with the clutch member 63. The clutch member 63 is operated by means of a rock shaft 65 mounted in suitable bearings in the side of the bed 1, the forked arm 66 being connected with the clutch member 63 for throwing said member into and out of engagement with the clutch member 64 on the lower face of the worm gear 61. The hand lever 67 is secured upon the outer end of the rock shaft 65 for operating the same.

Upon the side of the vertical slide member 30 is secured an apertured bracket 68 through the aperture of which extends a vertical rod 69, the lower end of which is connected to the handle 67. The rod 69 carries a set stop 70 which may be adjusted along the rod 69. This latter mechanism serves as a stop mechanism for throwing the feed shaft 62 out of gear when the cutter upon the cutter slide has reached the necessary low point in its travel. The feed shaft 62 heretofore referred to, is screw threaded as illustrated at 71 in Figs. 2, 3 and 4, throughout its entire length above the bed 1 and extends to the upper end of the stanchion 3, in which it finds a bearing. The slide 30 is provided with a threaded nut 72 for engagement with the screw threaded portion 71 of the feed shaft 62. It will thus be noted that the rotation of the shaft 62 will cause a vertical movement of the slide 30. Secured to the upper end of the shaft 62 is the spiral gear 73 which engages with the spiral gear 74 mounted upon the short horizontal shaft 75, which is carried by a frame 76 mounted upon the upper end of the stanchion. This shaft 75 has one end squared for the purpose of mounting a crank thereon, and so that the carriage or slide 30 may be elevated or lowered by hand, when the clutch members 63 and 64 at the lower end of the shaft 62 are out of engagement.

The frame 76 mounted upon the upper end of the stanchion 3, carries the large sheave 77, over which passes the cable 78, one end of which is secured to the upper end of the slide 30, the other end of said cable carrying the counter-weight 79. In this manner, the weight of the carriage 30 is properly counter-balanced so as to relieve the strain upon the feed shaft 62.

The shaft 58 is mounted in suitable bearings 80 at either end of the bed as illustrated in Fig. 2. Splined upon this shaft 58 to rotate therewith, is the spur gear 81 which meshes with the sleeved spur gear 82 carried by the supplemental shaft 83, which lies above and parallel to the shaft 58. The shaft 83 is mounted in suitable bearings upon a laterally movable frame 84, which is supported upon the side of the index wheel guard 101, hereinafter referred to.

The sleeved spur gear 82 is mounted upon the sleeve or hub 85 of a worm gear 86, the latter being keyed directly to the shaft 83. The worm 87 is mounted in the extension or guard 88 of the sleeve 89 and meshes with the worm gear 86 and is designed for adjusting the index worm 90 which is integral with the shaft 83, the same being for the purpose of meshing with the index wheel 100 hereinafter referred to.

The spindle carriage 91 slides longitudinally of the bed 1 upon the ways 92, and may be rigidly secured to the bed through the bolts 93, the T-shaped heads of which slide in the T-shaped slots in the ways 92. The spindle carriage 91 extends downwardly into the frame of the bed as illustrated in Fig. 8, and the lower outer edges thereof, are provided with ways 94 for engagement with tracks 95 upon the in-turned flanges of the side of the bed 1.

The tapering aperture 96 extends vertically through said spindle carriage as illustrated and carries the rotatable spindle sleeve 97, the upper end of which is flanged and rests upon the upper side of the spindle carriage 91. Rigidly secured to the lower end of the spindle sleeve 97 by means of keys 98 and nut 99, is the index worm wheel 100, which normally meshes with the worm 90 heretofore described. Secured to the lower end of the spindle carriage 91 is the index wheel guard 101, the lateral flange of which extends down and covers the periphery of the index wheel 100. Upon the left hand side of this guard 101 is mounted to slide laterally, the frame 84 heretofore referred to, so that said frame in sliding laterally, will carry with it, the shaft 83 with its worm 90 out of engagement with the index wheel. The means for producing this lateral sliding, consists of a lever 102 pivotally secured in the frame 84 and having one arm thereof, extended into a slot provided in the guard 101, so that lateral movement of the handle 102 will cause the frame 84 to slide laterally as described. In this manner, the index wheel may at any time be thrown out of gear with the rest of the operating parts of the structure. The frame 84 may be rigidly secured in position with the worm 90 in mesh with the gear 100 by means of the bolts 103 passing through slots 104 in the frame 84 and screwed into the guard 101. Mounted in the upper part of the spindle sleeve 97 is the bushing 105 as shown, rigidly secured to the sleeve 97 by the bolts 106. This bushing is provided with a central tapered aperture to receive the work spindle 107, upon which the gear to be cut is mounted. As a convenient means for firmly securing the spindle 107 into the bushing 105, we have provided the differential nut 108 exteriorly threaded into the bushing 105 as shown and interiorly threaded with a finer pitch thread to receive a corresponding screw upon the spindle 107 as shown.

If desired, bearing metal rings 109 may be located between the flange of the spindle sleeve 97 and the upper face of the spindle carriage 91 to relieve excessive friction. We have also provided the large face plate 110 secured to the upper end of the carriage 91 or to the spindle sleeve 97 as desired, for the double purpose of supporting large gear blanks to be cut as well as of catching the metal turnings and oil when in use.

As a means for longitudinally reciprocating the carriage 91, we have provided the feed screw 111 which is mounted to rotate in the end of the bed 1 as shown in Fig. 5, the screw threaded portion thereof being received in a nut or screw threaded aperture 112 in the side of the spindle carriage 91.

Under certain circumstances, as for example, in cutting worm wheels with this machine, it is necessary to automatically feed the carriage 91 forward with the work upon the spindle 107 or against the cutter. To provide for this, the shaft 59 heretofore described, extends through the forward end of the bed 1 as shown and carries at its forward end, a bevel gear wheel 113. Mounted upon the hub of the bevel gear 113 is the swinging frame 114, carrying the shaft 115 upon the left hand end of which is the bevel gear 116, meshing with the bevel gear 113. This shaft has upon it, the worm 117 which meshes with the worm wheel 118 upon the feed screw 111. The outer end of the feed screw 111 is provided with a hand wheel 119 for hand operation when desired. The frame 114 as described, is a swinging frame and may be held in position with the worm 117 in mesh with the worm wheel 118 by means of a spring bolt 120, carried by a bracket 121 upon the right hand side of the bed 1. This spring bolt 120 passes through an apertured bracket 122 upon the side of the spindle carriage 91 and when the collar 123, adjustably secured to the bolt 120 contacts with the bracket 122, the bolt 120 is withdrawn against the spring pressure from the outer end of the frame 114, when by its own weight, said frame will fall and carry the worm 117 out of engagement with the worm wheel 118, under which circumstances, forward motion of the carriage 91 is stopped.

In the cutting of gear wheels, whether they be worm, spiral or spur, the greatest degree of accuracy in the adjustment of the parts is necessary, in order that the resultant gears may be accurately cut. It is therefore desirable that in a machine of this type, mechanism be provided whereby both the cutter and the index wheel may be accurately adjusted. We will first proceed with a description of the cutter adjustment.

Inasmuch as the parts of a machine of this type, when in gear, must be substantially rigid, that is, there must be practically no back-lash or yielding to the parts, and inasmuch as the work upon which the cutter is engaged is constantly advancing, as to rotation, when set, it is possible and even probable, that the particular thread of the cutter which should be on a line with the axis of the blank to be cut, may be just a little out of true, either one way or the other, that is, it may be a little out of the vertical plane passing through the axis of the blank spindle, and it becomes necessary to longitudinally adjust the cutter in line with its axis without rotating the same. In order to provide for this adjustment, we have devised an improvement which we will now proceed to describe.

Referring to Fig. 7 of the drawings, as heretofore described, 34 is the swivel carriage upon which the cutter 41 is mounted. The cutter shaft 39 in order to be longitudinally adjustable, is mounted in a slide 124, which is arranged to move or slide radially in the ways 125 upon the face of the swivel base 34. Apertured lugs are provided on the slide 124 through which the bolts 126 are inserted with their T-shaped heads located in the T-shaped slots 127, so that when the slide 124 carrying the cutter shaft 39 with its cutter 41 are in adjusted position, the nuts upon said bolts 126 may be screwed up to positively fix the slide 124 in the correct adjusted position. In order to form a perfect bearing for the cutter shaft 39, we provide a bushing sleeve 128 surrounding the cutter shaft and extending longitudinally of the slide 124. The forward end of said sleeve, that, the end nearest the cutter, is tapered upon its outer side to fit the tapered aperture 129 in the slide, that portion of the sleeve adjacent to the cutter being split longitudinally so as to readily adjust itself to the periphery of the shaft when moved toward the cutter 41. This sleeve is fixed against rotation by means of the shouldered set screw 130. As a means for longitudinally adjusting the sleeve bearing 129, we have provided upon the end of the slide 124, a screw threaded portion 131 upon which is the adjusting thimble 132 which may be longitudinally adjusted to cause the tapered split portion to take into the tapered interior of the slide 124, and thus form a more perfect bearing for the cutter shaft. The shaft 39 is enlarged in that portion thereof which is received into the slide 124, and sleeve 128. It will be noted that the cutter shaft 39 is provided with an integral collar 39' which bears against the outer end of the sleeve 128. This forms a bearing against which a loose collar $39^2$ bears, said loose collar being under pressure from the thimble 132. When the thimble 132 is properly adjusted to secure the proper bearing for the cutter shaft 39, it may be secured in such adjusted position by means of the set nut 129'.

Projecting from the side of the slide 124 is the apertured lug 133 which is in alinement with an apertured lug 134, extending outwardly from the face of the swivel carriage 34. A screw threaded adjusting bolt 135 is fixed into the apertured lug 133 and passes through the aperture of the lug 134, having set nuts on either side of said lug 134. By these means, it will be noted that the slide 124 may be longitudinally adjusted in the ways 125 in either direction within the required limits and when such adjustment is completed, the nuts on the bolts 126 are screwed home, thereby rigidly fixing the slide 124 in adjusted position. The cutter shaft 39 is provided with spur gear 40 as heretofore described, which is driven by the cutter drive shaft 37 through the spur gear 38. In order to form an outer support for the opposite end of the cutter shaft, we provide the bracket 136 projecting from the face of the cutter carriage or swivel 34 as illustrated in Fig. 7. This bracket merely forms a support for the bearing for the end of the shaft, said bearing being longitudinally adjustable in the direction of the length of the shaft as illustrated, the bolts 137 being provided for such purpose, such bolts passing through clamps as illustrated in Fig. 3 of the drawings and screwed into the end lugs on the bracket as also shown in Fig. 1. In this manner, we are able to longitudinally adjust the cutter, so that the center of a selected tooth may be in a vertical plane passing through the blank spindle shaft and the longitudinal axis of the machine. In order to make this adjustment accurate, we have devised a cutter gage 139 as illustrated in Figs. 10 and 11, which cutter gage is secured to the face of the sleeve 124 by screwing the thumb screw 140 into the screw hole 141, which is shown in Fig. 7, the forked arms 142 of the gage resting upon shoulders 143 upon the bracket 136. Mounted in an aperture upon the gage frame 139 so as to be in line with the axis of the cutter 41 is the gage finger 144, having the thumb piece as illustrated in Figs. 10 and 11, such gage finger having its inward end chamfered off as illustrated to bear against the edge of a cutter tooth. An index line is also provided upon the plain or chamfered face of the projecting finger, which index line is used as a gage for the longitudinal adjustment of the cutter shaft, so as to bring the center line upon the face of the cutter tooth in registry with said index line. By the use of such cutter gage, it is possible to very accurately adjust the cutter to proper position for accurately recutting teeth in a gear wheel.

Used in conjunction with the adjusting mechanism just described, is the index adjusting mechanism connected with the index drive as illustrated in Figs. 5, 8, 9 and $9^a$, as heretofore described. When the gear wheel to be recut is mounted upon the blank spindle 107, it is only by chance that such gear is so adjusted as to bring its teeth in registry with the cutter 41, and for this reason, we have provided the adjusting mechanism mounted upon the index screw shaft 83 as heretofore described. In order to bring the teeth of the gear to be recut in mesh with the gear cutter, it is only necessary to adjust the worm 87, so as to rotate the index shaft 83 and with it, the index wheel and blank spindle, independent of the rest of the mechanism, until the teeth of the gear wheel are in proper registry with the cutter teeth, and when such adjustment is made, the mechanism is ready for operation. As a convenient means for measuring or gaging the degree of this latter adjustment, we have provided a vernier scale 145 upon the forward end of the shaft 83 and its adjacent bearing.

As hitherto stated, the mechanism described is equally capable of cutting spur, spiral or worm gears. Different parts of the operating mechanism, however, are used for these different operations.

We will now proceed to describe the mechanism as used for cutting spur gears with a helical or hob cutter 41. Having placed the helical cutter 41 upon the cutter shaft 39, and having adjusted the swivel 34 to the proper angle, said swivel is then secured rigidly to the slide 30. The center tooth of the cutter is adjusted as heretofore described, by the use of the cutter gage 139. The gear blank is then secured to the blank spindle 107 as shown in Fig. 1, while the carriage 91 with the blank is moved forward to a point so that the blank just touches the periphery of the helical cutter at the center tooth. This it is understood, is done by means of the hand wheel 119. The cutter carriage or slide 30 is then raised by means of the crank placed upon the horizontal shaft 75 at the top of the stanchion 3 and turning the same to operate the vertical carriage feed screw until the cutter just clears the blank. The blank carriage is then moved forward to a distance equal to the depth of the teeth to be cut by means of the hand wheel 119, such distance being accurately measured by means of the micrometer scales 146 and 147 upon the bed 1 and the spindle carriage feed screw 111. The blank carriage 91 is then clamped to the bed by means of the bolts 93. The proper feed is then determined upon and the change wheels 52 to 57 are properly adjusted in their position upon the shafts at the rear of machine and the same is geared up in accordance with the formula $$\frac{C}{N}.$$

The clutch is then thrown into position by means of the hand lever 67, while the stop 70 is properly adjusted to disengage the feed when the blank is finished as heretofore described. It is understood in this connection that the index worm 90 and wheel 100 are thrown into engagement by means of the handle 102, while the frame 114 with the worm 117 is thrown out of engagement with the worm wheel 118. This it is understood is done by withdrawing the rod or bolt 120 from engagement with the notch in the frame 114 as illustrated in Fig. 5. With the machine thus adjusted, it is only necessary to throw the bevel gear wheel 16 into mesh with the gear 26 upon the lower end of the shaft 24 and set the mechanism in motion by connecting the driving belt to the driving cone 14. With the mechanism thus adjusted, the cutter will be found to feed gradually across the face of the blank until all of the teeth are completed, when it is only necessary to release the blank carriage from the bed and withdraw the completed gear from engagement with the cutter and remove the completed gear from the spindle.

To cut spiral gears, the cutter and blank are adjusted in substantially the same manner as for cutting spur gears, with one or two slight adjustments. The cutter axis is set off at an angle (from the horizontal) equal to the angle of the helix of the spiral to be cut, minus the angle of the helix of the cutter, provided the latter is a right hand cutter and the helix of the gear to be cut, is also right hand. Under these conditions, the cutter spindle drive gear 40 must be turned upon the right hand side of the machine, while when cutting a left hand helical gear, it is necessary to set the cutter at an angle equal to the sum of the angles of the helices of the cutter and blank to be cut, but with the driving gear 40 upon the opposite or left hand side of the machine as illustrated in the drawings, and vice-versa, when using a left hand helical cutter. To facilitate the accurate setting of the cutter to the proper angle, we have provided the circular scale 148 upon the edge of the swivel 34. The center line of the cutter shaft 39 is always located somewhere in a semicircular arc above the horizontal and is intended to swing when making these adjustments from a right hand gear to a left hand on each side of the perpendicular. Under these circumstances, it becomes necessary to reverse the direction of rotation of the helical cutter, in order to always cut on the forward feed. This is done by simply reversing the direction of motion of the main cutter drive shaft 24 through the bevel gears 16 and 17 by means of the operating handle 22 adjacent the cone 14.

Having selected the proper feed gears which largely depend upon the angle of the spiral to be cut, such gears are placed upon the various shafts as illustrated in Fig. 6, as 52, 53, 54, 55, 56 and 57 in accordance with the formulas $$\frac{CC'P^{nc} \pm V \sin. \alpha}{C'NP^{nc}}$$

or $$\frac{CC'P^{c} \pm V \tan. \alpha}{C'NP^{c}}$$

or $$\frac{CC' + VP^{nd} \sin. \alpha}{C'N\pi},$$

using the positive or negative signs as hitherto described. The feed is then engaged and the stop 70 is set as described in connection with the cutting of spur gears.

In cutting the spiral gears with a steep helical angle, it is sometimes preferable to gear up 52 to 57 according to the formula $$\frac{C}{N}$$

and disengaging the down feed and engaging the inward feed of the work slide or carriage, so as to cut the blank to a depth of about ⅔ of the depth of the tooth, so as to bring more teeth of the blank into action than would otherwise be possible by feeding downward and setting the blank to the proper depth. After the blank or work slide has been fed ⅔ of the depth of a tooth, the regular gears may be replaced at 52 to 57 by gears calculated according to the spiral gear formula and reëngaging the downward feed of the cutter slide or carriage and disengaging the inward or blank carriage feed, thus cutting ⅓ of the proper depth across the face of the gear. When this is done, the machine should be stopped and the blank disengaged from the cutter; the downward feed should also be disengaged while the cutter slide 30 is raised to an amount so that the cutter should clear the upper edge of the blank and equal to a multiple part of the formula as calculated thus, $$P^L = \frac{P^{nc}}{\sin. \alpha} = \frac{\pi}{P^{nd} \sin. \alpha'},$$

which is the linear pitch parallel with the axis of the gear, for example, it will be either two or three times $P^L$ depending upon the width of the face of the gear to be cut.

In order to set the blank and cutter in their correct positions for cutting worm gears, we have provided a vernier 150 upon the spindle carriage and a scale 151 upon the bed, by means of which we are enabled to accurately gage the depth to be cut in the blank. In cutting worm gears, the data given usually comprises, among other things, the distance between the axis of the worm and the axis of the worm wheel and this distance can be accurately set off upon the scale 151 by means of the vernier 150.

In cutting worm gears with the universal cutter as above described, it is only necessary to set the cutter in the same relation to the blank as the driving worm will bear to the finished gear and secure the cutter slide 30 in such position. The downward feed of the cutter slide will be disconnected and the inward feed of the blank carriage will be connected as illustrated in Fig. 5. As heretofore described, when the cutter has cut the blank to the proper depth, the stops 122 and 123 will have engaged and have disconnected the inward feed of the blank carriage when all further cutting will cease and the gear will be finished.

We claim:

1. In a gear cutting machine, the combination with a main drive shaft, of a cutter shaft having a cutter mounted thereon, gearing connecting said shafts, including reversing gears, a cutter feed shaft, drive and change gears between said main drive and feed shafts, an index shaft, drive and change gears between said main drive shaft and index shaft, said drive and change gears so arranged to produce a helical line of action passing around the axis of the blank.

2. In a gear cutting machine, the combination with a main drive shaft, of a cutter carriage, an angularly adjustable cutter shaft mounted therein having a cutter secured thereto, gearing connecting said shafts, comprising reversing gears, a cutter feed shaft to actuate said cutter carriage, drive and change gears between said main drive and feed shafts, a work spindle carriage, a work spindle rotatably mounted therein, an index shaft to actuate said work spindle, drive and change gears between said main drive and index shafts, and drive and change gears so arranged to produce a helical line of action passing around the axis of the work spindle.

3. In a gear cutting machine, the combination with a blank spindle carriage, of a spindle rotatably mounted therein, a cutter carriage, an angularly adjustable cutter shaft rotatably mounted therein, having a cutter secured thereto, means to rotate said cutter including reversing gears, means to feed said cutter substantially parallel to the axis of said blank spindle and relatively to the rotations of said cutter, and means to rotate said blank spindle relatively to the feed and rotations of said cutter, said relative means arranged to produce a helical line of action passing around the axis of said blank spindle.

4. In a gear cutting machine the combination with a blank spindle carriage, of a blank spindle rotatably mounted therein, a cutter carriage, an angularly adjustable cutter shaft rotatable therein having a cutter secured thereto, means to rotate said cutter including reversing gears, means to feed said cutter relatively to the rotation thereof, means to rotate said blank spindle relatively to the feed and rotations of said cutter, comprising a main drive shaft, a countershaft rotating in synchronism with said cutter, drive and change gears connecting said countershaft and blank spindle and drive and change gears from said countershaft to said feeding means, to produce a helical line of action passing around the axis of said blank spindle.

5. In a gear cutting machine, the combination with a main drive shaft, of a cutter carriage, a swivel carriage mounted thereon, a cutter shaft mounted in said swivel carriage, having a cutter secured thereto, gearing arranged between said main drive and cutter shafts to rotate said cutter including reversing gears, a countershaft, gearing between said main drive and countershafts, having a ratio equal to, or a multiple of, said gearing between said main drive and cutter shafts, means to feed said cutter relatively to the rotation thereof, including drive and change gears between said countershaft and feeding means, a blank spindle and means to rotate said blank spindle relatively to the feed and rotation of said cutter, comprising drive and change wheels between said countershaft and blank, said gearing arranged to produce a helical line of action passing around the axis of said blank spindle.

6. In a helical gear cutting machine, the combination with a frame, a cutter carriage adjustably mounted thereon, an angularly adjustable slide mounted on said carriage, a cutter shaft mounted therein, a main drive shaft, a gear train connecting said main and cutter shafts, reversing gears interposed in said gear train, whereby the direction of rotation of said cutter shaft can be reversed, a work slide adjustably mounted upon the said frame, substantially at right angles with said cutter carriage, a work mandrel revoluble therein, a worm wheel secured thereto, gearing between said main drive shaft and worm wheel to produce a relative rotational ratio between said cutter shaft and worm wheel, and a feeding means, to feed said cutter shaft substantially parallel with the axis of said cutter and dependent upon the rotations of said cutter shaft, to produce a helical line passing around the axis of said work spindle.

7. In a helical gear cutting machine, the combination with a main frame, of a cutter carriage adjustably mounted thereon, an angularly adjustable slide mounted on said carriage, a cutter shaft mounted therein, a main shaft, a gear train connecting said main and cutter shafts, reversing gears interposed in said gear train whereby the direction of rotation of said cutter shaft can be reversed, a work slide adjustably mounted upon said frame substantially at right angles with said cutter carriage, a work mandrel revoluble therein, a countershaft, drive and change gears between said countershaft and work mandrel, gearing between said main and counter shafts, having a ratio equal to, or a multiple of, said gearing connecting said main and counter shafts, all of said gearing combined to produce a relative rotational ratio between said cutter shaft and work mandrel, and a feeding means to feed said cutter shaft substantially parallel with the axis of said cutter and dependent upon the rotations of said cutter shaft to produce a helical line passing around the axis of said work spindle.

8. In a helical gear cutting machine, the combination with a main frame, of a cutter carriage adjustably mounted thereon, an angularly adjustable slide mounted on said carriage, a cutter shaft mounted therein, a main shaft, a gear train connecting said main and cutter shafts, a work slide adjustably mounted upon said frame substantially at right angles with said cutter carriage, a work mandrel revoluble therein, a counter shaft, drive and change gears between said counter shaft and work mandrel, gearing between said main and counter shafts having a ratio equal to, or a multiple of said gearing connecting said main and cutter shafts, all of said gearing combined to produce a relative rotational ratio between said cutter shaft and work mandrel, a feeding screw to feed said cutter shaft substantially parallel with the axis of said cutter, gearing between said counter shaft and feed screw, to produce a helical line passing around the axis of said work spindle.

9. In a helical gear cutting machine, the combination with a blank spindle carriage, of a spindle rotatably mounted therein, a cutter carriage, an angularly adjustable cutter shaft rotatably mounted therein, and having a cutter secured thereto, means to rotate said cutter, means to feed said cutter substantially parallel to the axis of said blank spindle and relatively to the rotations of said cutter, and means to rotate said blank spindle relatively to the feed and rotations of said cutter, said relative means arranged to produce a helical line of action passing around the axis of said blank spindle.

10. In a helical gear cutting machine, the combination with a blank spindle carriage, of a blank spindle rotatably mounted therein, a cutter carriage, an angularly adjustable cutter shaft rotatable therein, having a cutter secured thereto, means to rotate said cutter, means to feed said cutter relatively to the rotation thereof, means to rotate said blank spindle relatively to the feed and rotations of said cutter, comprising a main drive shaft, a countershaft rotating in synchronism with said cutter, drive and change gears connecting said countershaft and blank spindle, and drive and change gears from said countershaft to said feeding means, to produce a helical line of action passing around the axis of said blank spindle.

11. In a helical gear cutting machine, the combination with a main drive shaft, of a cutter carriage, a swivel carriage mounted thereon, a cutter shaft mounted in said swivel carriage and having a cutter secured thereto, gearing arranged between said main drive and cutter shafts to rotate said cutter, a countershaft, gearing between said main drive and countershafts, having a ratio equal to or a multiple of said gearing between said main drive and cutter shafts, means to feed said cutter relatively to the rotation thereof, including drive and change gears between said countershaft and feeding means, a blank spindle and means to rotate said blank spindle relatively to the feed and rotation of said cutter, comprising drive and change wheels between said countershaft and blank spindle, said gearing arranged to produce a helical line of action passing around the axis of said blank spindle.

12. In a helical gear cutting machine, the combination with a main shaft, a cutter shaft arranged to be angularly adjustable within a semi-circle, driving connections between said main and cutter shafts to rotate said cutter shaft when in any angular position, a work spindle an index shaft therefor, an index shaft, driving connections between said main and index drive shafts to rotate said index drive shaft relative to the cutter shaft, a feed shaft, to feed said cutter shaft substantially parallel with said blank spindle, driving connections between said index drive and feed shafts to feed said cutter relatively to the rotations thereof, and driving connections between said index drive and index shafts to rotate said blank spindle relative to and dependent upon the rotations and feed of said cutter to produce substantially a helical line passing around the axis of the blank spindle.

13. In a helical gear cutting machine, the combination with a main shaft, a cutter shaft, driving connections between said main and cutter shafts to rotate said cutter shaft, a work spindle, an index shaft therefor, an index driving shaft, driving connections between said main and index drive shafts to rotate said index drive shaft relative to said cutter shaft, a feed shaft to feed said cutter shaft substantially parallel to said blank spindle, driving connections between said index drive and feed shafts to feed said cutter relative to the rotations thereof, driving connections between said index drive and index shafts, and change speed elements interposed in said driving means to rotate said blank spindle relative to and dependent upon the rotations and feed of said cutter shaft to produce a helical line passing around the axis of the blank spindle.

14. In a helical gear cutting machine, the combination with a main shaft, a cutter shaft, driving connections between said main and cutter shafts to rotate said cutter shaft, a work spindle, and index shaft therefor, an index driving shaft, driving connections between said main and index drive shafts to rotate said index drive shaft relative to said cutter shaft, a feed shaft to feed said cutter shaft substantially parallel to said blank spindle, driving connections between said index drive and feed shafts, and change speed elements interposed therein to feed said cutter relative to the rotations thereof, driving means connecting said index drive and index shafts, and change speed elements interposed in said driving means to rotate said blank spindle relative to and dependent upon the rotations and feed of said cutter shaft to produce a helical line passing around the axis of the blank spindle.

15. In a helical gear cutting machine, the combination with a blank spindle, of an index shaft connected therewith, an index drive shaft, a cutter shaft, a feed shaft to feed said cutter shaft and blank spindle relative to each other in a direction parallel with said spindle, a main drive shaft, driving connections between said cutter and main shafts to rotate said cutter, other driving connections between said main and index shafts to rotate said index drive shaft relative to said cutter, and driving means connecting said index drive and feed shafts to feed said cutter shaft and blank spindle relative to each other and relative to and dependent upon the rotations of said cutter, and driving connections between said index drive and index shafts to rotate said blank spindle relative to and dependent upon the rotation of said cutter and feed shafts, to produce a helical line passing around the axis of said blank spindle.

16. In a helical gear cutting machine, the combination with a blank spindle of an index shaft connected therewith, an index drive shaft, a cutter shaft arranged to be angularly adjustable within a semi-circle, a feed shaft to feed said cutter shaft substantially parallel with said spindle, a main drive shaft, driving connections between said main drive and cutter shafts to rotate said cutter when in any angular position, driving connections between said main and index shafts, to rotate said index drive shaft relative to said cutter, driving means connecting said index drive and feed shafts to feed said cutter relative to the rotations thereof, and driving connections between said index drive and index shafts to rotate said blank spindle relative to and dependent upon the rotations and feed of said cutter shaft to produce substantially a helix whose directrix corresponds and is identical with the center of said blank spindle.

17. In a helical gear cutting machine, the combination with a blank spindle, of an index shaft connected therewith, a cutter shaft, a feed shaft to feed said cutter shaft substantially parallel with said spindle, a main shaft, driving connections between said main and feed shafts, change speed elements interposed therein to feed said cutter relative to the rotations thereof, driving connections between said main and index shafts and change speed elements interposed therein to rotate said blank spindle relative to and dependent upon the rotations and feed of said cutter to produce substantially a helix whose directrix coincides with the axis of said blank spindle.

18. In a helical gear cutting machine, the combination with a blank spindle and helical cutter, of means for imparting rotary motion to said cutter, means for feeding said cutter substantially parallel to said blank spindle and relatively to the rotations of said cutter, and means for imparting a single continuous and unvarying motion between said cutter and blank spindle relative to said feeding motion, to produce helices having a directrix substantially coinciding with the axis of said blank spindle.

19. In a helical gear cutting machine, the combination with a blank spindle and helical cutter, of means for imparting rotary motion to said cutter, means for feeding said cutter and spindle relative to each other in a line substantially parallel with said spindle, and means for imparting a single continuous and unvarying motion between said cutter and blank spindle relative to said feeding motion, to produce helices with a directrix substantially coinciding with the axis of said blank spindle.

This specification signed and witnessed this 22d day of January 1907.

FREDERICK L. EBERHARDT.
WILLIAM F. ZIMMERMANN.

Witnesses:
 Louis M. Sanders,
 C. A. Alliston.